July 10, 1956 W. F. BIRD ET AL 2,753,597
METHOD OF MAKING RAVEL PROOF EDGE AND APPARATUS
Filed June 1, 1954 3 Sheets-Sheet 1
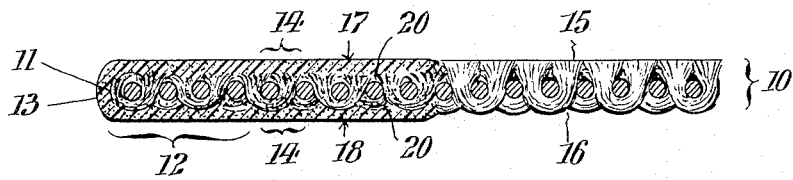
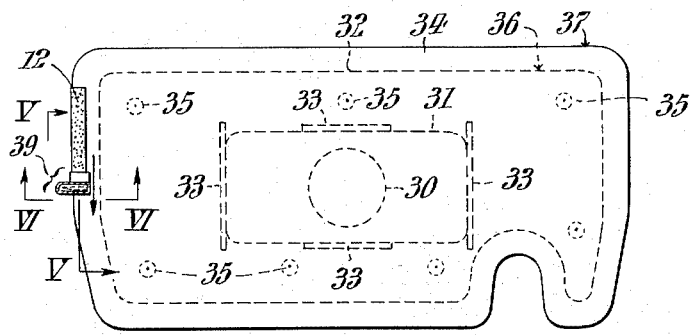
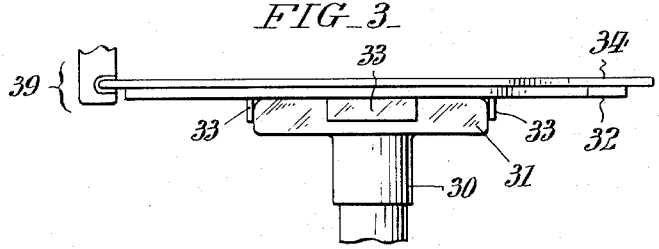
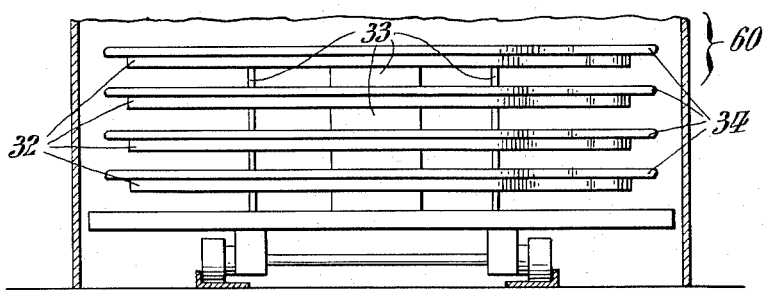
INVENTORS:
Whitworth F. Bird &
BY Glen S. Hiers,
Paul & Paul
ATTORNEYS.

July 10, 1956 W. F. BIRD ET AL 2,753,597
METHOD OF MAKING RAVEL PROOF EDGE AND APPARATUS
Filed June 1, 1954 3 Sheets-Sheet 2
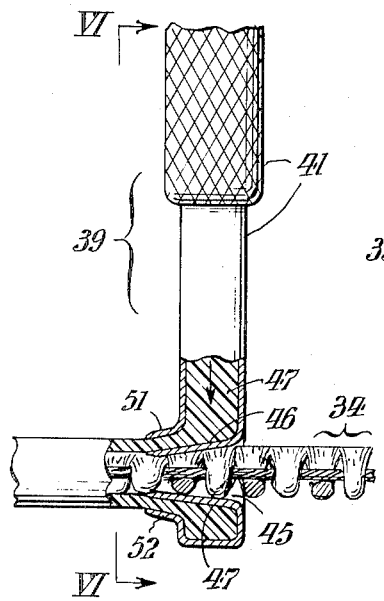
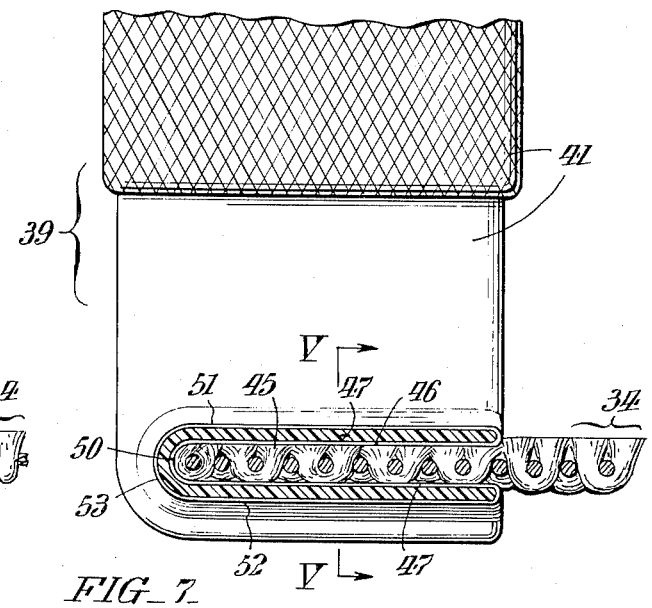
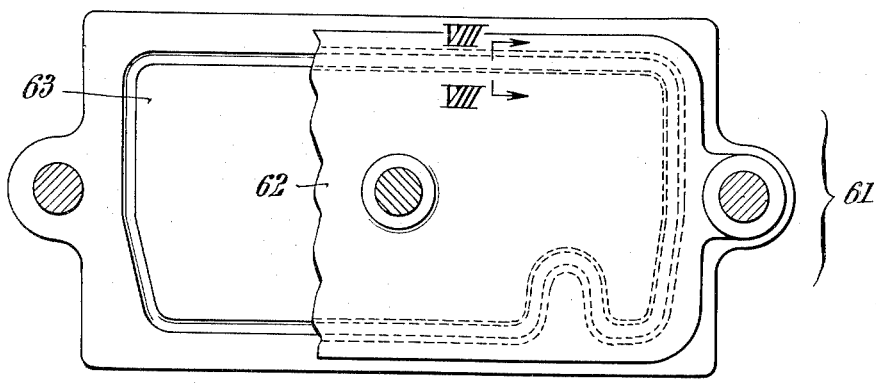
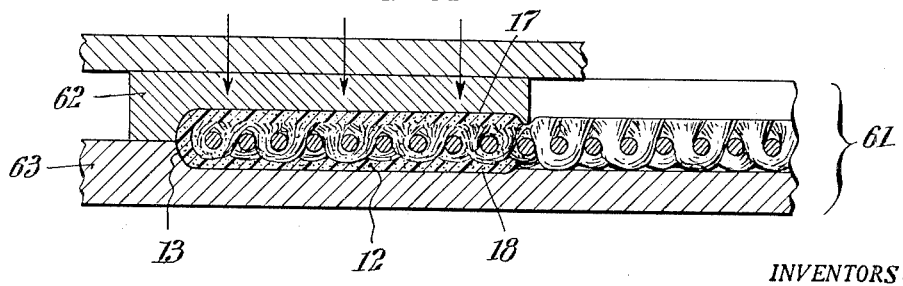
INVENTORS:
Whitworth F. Bird &
BY Glen S. Hiers,
Paul & Paul
ATTORNEYS.

July 10, 1956
W. F. BIRD ET AL
2,753,597
METHOD OF MAKING RAVEL PROOF EDGE AND APPARATUS
Filed June 1, 1954
3 Sheets-Sheet 3
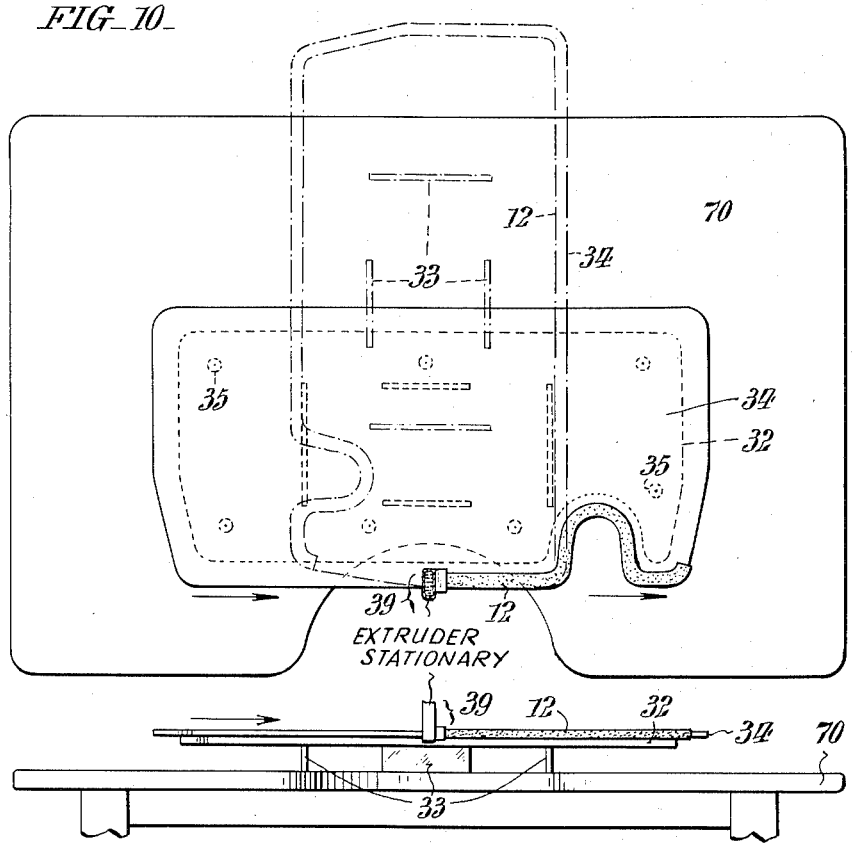
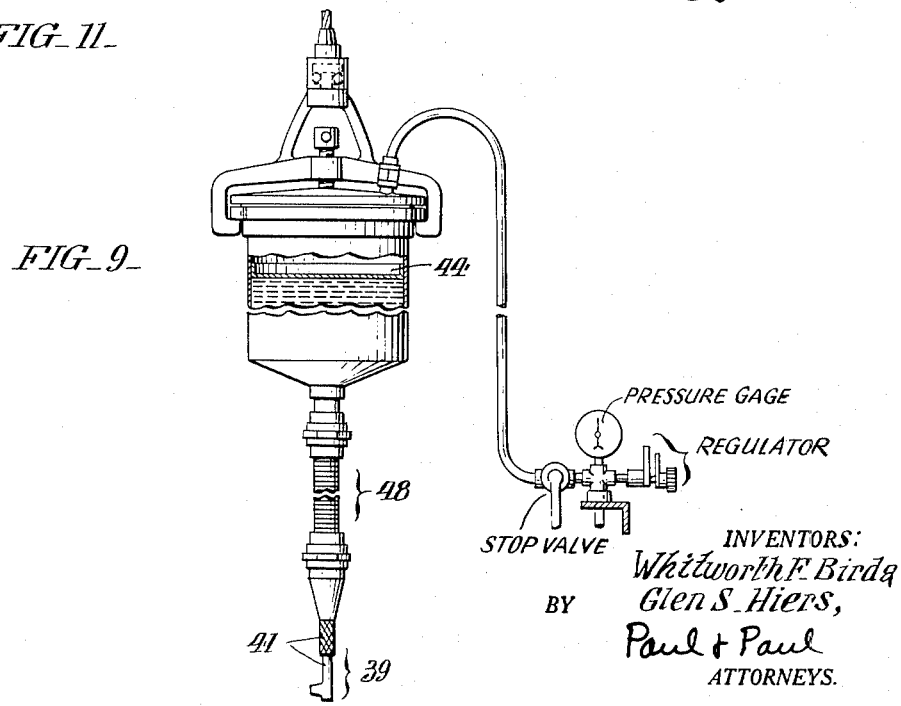
INVENTORS:
Whitworth F. Bird &
Glen S. Hiers,
BY
Paul & Paul
ATTORNEYS.

United States Patent Office 2,753,597
Patented July 10, 1956

2,753,597

METHOD OF MAKING RAVEL PROOF EDGE AND APPARATUS

Whitworth F. Bird, Riverside, Conn., and Glen S. Hiers, Bala Cynwyd, Pa., assignors to Collins & Aikman Corporation, Philadelphia, Pa., a corporation of Delaware Application June 1, 1954, Serial No. 433,428

2 Claims. (Cl. 18—13)

This invention relates to a cut carpet having a ravel proof edge of plastic material which is securely bonded to the edge of the fabric. The invention further relates to a method of forming a ravel proof edge portion on a piece of cut carpet such as an automobile carpet, for example, which has a complex peripheral shape.

Automobile carpets are conventionally manufactured by cutting a woven fabric to the desired shape, covering the edge of the cut carpet with a strip of textile or plastic tape, and then sewing the ends of the tape together through the carpet. Although mass production equipment has been designed for this purpose, considerable individual attention is still required since the automobile carpets have complex peripheral shapes. Accordingly, the manufacture of conventional automotive carpets is relatively expensive. Additionally, the sewing which joins the tape to the edge of the carpet sometimes fails after extended service, permitting the tape to come loose and allowing the edge of the carpet to ravel.

It is an object of this invention to overcome the foregoing disadvantages. Still another object is to provide a method of forming a ravel proof edge on a piece of fabric having a complex peripheral shape. Yet another object is to provide a piece of cut fabric having an edge portion of complex shape which is subject to raveling, said edge portion being covered with a securely bonded plastic coating which is locked into the fabric. Other objects and advantages of this invention, including the simplicity and economy of the same, will further appear hereinafter and in the drawings whereof:

Fig. 1 represents a sectional view of an edge portion of a piece of cut pile fabric, one edge of which is covered in accordance with the invention;

Fig. 2 represents a view in plan illustrating a special pallet which, in accordance with one specific method of this invention, carries an automobile carpet which is to be provided with a ravel proof edge;

Fig. 3 represents a vertical elevation of the arrangement illustrated in Fig. 2;

Fig. 4 represents an end view of a drying oven, illustrating a preferred step of the method of this invention;

Fig. 5 represents a view in side elevation, partially in section, as indicated by the arrows V—V in Figs. 2 and 6, showing one preferred apparatus for and method of applying a coating to a cut fabric edge in accordance with this invention;

Fig. 6 represents a sectional view taken as indicated by the lines and arrows VI—VI which appear in Figs. 2 and 5;

Fig. 7 represents a plan view, with portions broken away, of a press which performs another preferred step in accordance with the method of this invention;

Fig. 8 represents a view in section as indicated by the arrows VIII—VIII in Fig. 7, showing how the press completes the formation of the ravel proof edge in accordance with this invention;

Fig. 9 illustrates an extrusion apparatus used in applying an edge coating in accordance with the method shown in Figs. 1–8;

Fig. 10 is a view similar to Fig. 2, illustrating a modified method in accordance with this invention; and Fig. 11 is a vertical elevation of the arrangement of Fig. 10.

Turning now to the specific embodiment of the invention selected for illustration in the drawings, Fig. 1 discloses a woven pile fabric 10 having a peripheral edge 11 covered with a plastic member 12. The plastic member 12 includes a curved edge portion 13 and two strip portions 14, 14 which are formed integrally with the edge portion 13. The strip portions 14, 14 consist of marginal strips which are bonded to the opposed front and back faces 15, 16 of the fabric 10. The marginal strip portions 14, 14 have smooth exposed faces 17, 18 which are substantially flush with the front and back faces 15, 16 of the fabric 10. The face 18, however, is slightly offset with respect to the face 16.

Each of the marginal strip portions 14, 14 is internally bonded to the fabric 10 beneath the surface thereof. The bond is formed by an internal plastic portion 20, 20 which extends into the fabric and is locked to the fabric below its surface.

Figs. 2–9 of the drawings illustrate one specific method and apparatus for making the fabric illustrated in Fig. 1. Figs. 2 and 3 show a special pallet 32 carried on a head 31 supported on a rotatable shaft 30. The pallet is provided with four holding plates 33 embracing the head 31 and retaining the pallet on its head. The plates 33 serve also for another purpose later on explained. An automobile carpet 34, or any other fabric having a cut edge, is placed on top of the pallet 32 and is secured in position relative to the pallet 32 by pins 35 fixed to the pallet. From Fig. 2 of the drawings, it will be apparent that the outer edge 36 of pallet 32 has a complex peripheral shape which corresponds to the peripheral shape 37 of the carpet 34. However, the edge 36 is spaced slightly inwardly of the edge 37. The number 39 designates comprehensively an extrusion die which is located adjacent to the peripheral edge 37 of carpet 34. In accordance with this invention, the pallet 32 with its carpet 34 is moved longitudinally with respect to the extrusion die 39, whereby a continuous plastic covering is applied to the marginal edge of the carpet. This relative movement is preferably accomplished by rotating the table 31 about the axis of its shaft 30. The extrusion die 39 is preferably mounted in such manner that it may be rotated about a vertical axis and may also be moved toward and away from the axis of shaft 30. Accordingly, the extrusion die 39 is continuously maintained immediately adjacent the edge 37 of carpet 34, regardless of the character of the complex peripheral shape of said edge 37. This free movement of the extruder is especially useful where the carpet edge curves inwardly as shown.

Turning now to Figs. 5 and 6 of the drawings, the construction of the extrusion die and the manner in which it applies the plastic coating to the edge of the carpet are shown in more particular detail. The number 41 designates a flat chamber containing the plastic which is also used as a handle to guide the extrusion die. A pressure means such as piston 44 is provided, as indicated in Fig. 9, which is connected to the chamber 41 by flexible, high pressure tubing 48. As shown in Fig. 5, the chamber 41 has adjacent its lower end a transverse slot 45 into which the peripheral edge of the carpet 34 extends. At the upper edge of the peripheral slot 45 is a longitudinally inclined plate member 46 while a similar, oppositely inclined plate member 47 defines the lower edge of slot 45. The closed end of slot 45 is formed by a curved plate 50 which is formed integrally with the upper and lower plates 46, 47.

Means are provided on chamber 41 forming a U-shaped opening from which the plastic is extruded. This means includes an upper inclined rigid plate 51 which is parallel to and spaced above the plate 46. The feed means also includes a lower rigid plate 52 which is parallel to and spaced below the plate 47. The plates 51, 52 are connected by a curved end plate 53 which is parallel to and spaced from the end plate 50.

From Fig. 5 it will be appreciated that, due to the inclination of the plates 46, 47, the carpet 34 is compressed as it is fed longitudinally between them. Preferably the distance between the plates 46, 47 at their ends is somewhat less than the initial thickness of the carpet 34. Accordingly the carpet is compressed somewhat just prior to the application of the extruded plastic to it. The plastic is continuously applied to the carpet 34 by feeding the carpet between the plates 46, 47 at a linear speed which is equal to the linear speed of extrusion of the plastic.

Immediately after completion of the extrusion step, a plurality of pallets 32 may be removed from the heads 31 and stacked in an oven 60, as illustrated in Fig. 4. By virtue of the construction and arrangement of the plates 33, the pallets can be easily removed from the head 31 and the plates 33 serve also to keep the carpets spaced apart. The fabric and plastic are heated to a temperature above the minimum temperature at which the plastic becomes fluid. Thus the plastic is caused to penetrate deeply into the fibres of the carpet.

In accordance with a subsequent step of the process, each pallet is removed from the oven 60 and placed in a press 61, as indicated in Figs. 7 and 8. The press includes upper and lower die members 62, 63 which may be heated if desired. In accordance with the method of this invention, die members 62, 63 are brought together for a time sufficient to press the plastic into the fabric of the carpet 34. Upon removing the fabric from the press (and cooling the fabric and plastic, if necessary) the portions 20 of the plastic are securely and permanently locked to the fabric beneath the surface thereof.

Figs. 10 and 11 illustrate a modified method. Here the extrusion nozzle is stationary and the carpet on its pallet is resting on a large table 70. The edge of the carpet is fed by hand through the extrusion nozzle, as shown. The pieces 33 on the pallet serve here to keep the edges of the carpet spaced above the surface of the table 70. The extrusion nozzle is held stationary.

Although we have referred herein to specific methods wherein heat is utilized to maintain the plastic in a fluid condition, other means well known in the art may be substituted. Other substitutions of method steps and apparatus will also become apparent.

Although it is desirable in many instances to heat the combined fabric and extruded strip, and to press the strip into the fabric, these steps are not essential where the fabric is sufficiently porous and the plastic is sufficiently hot and fluid to provide an adequate degree of penetration during the extrusion step.

It will be appreciated that either thermoplastic or thermal curing resins may be utilized in accordance with this invention. The latter require a curing step to insure maximum insolubility.

It will be appreciated that a wide variety of resins may be used. Such resins as vinyl chloride, vinyl acetate, vinylidene chloride, phenol, melamine or urea aldehyde condensates, styrene and its copolymers with butadiene, acrylonitrile, acrylic resins, acrylonitrile resins, polyethylene, natural rubber neoprene and various other elastomers may be used, for example.

Although we have described our invention by reference to one embodiment thereof, it will be apparent to those skilled in the art that various changes other than those referred to above may be made in the form of the invention, that equivalent elements may be substituted for those illustrated in the drawings, and that certain features of the invention may be used to advantage independently of the use of other features, all within the spirit of the invention as defined in the annexed claims.

Having thus described our invention, we claim:

1. In a method of forming a ravel proof edge on a piece of cut fabric having a complex peripheral shape, the steps which comprise feeding said periphery of said fabric through a die which includes a pair of plate members which are inclined toward one another in the direction of feed and which plate members have terminal edges that are close enough to each other to compress the fabric which is disposed intermediate said terminal edges, continuously extruding fluid plastic over the edges of said inclined plate members on both opposite surfaces of said fabric while said fabric is so compressed, pressing the plastic into the marginal edge of the fabric while said plastic is fluid, thereby causing some of said plastic to penetrate into said fabric, and setting said plastic in and on said fabric.

2. An extrusion die for applying a marginal plastic strip to the peripheral edge of cut fabric which has a complex shape comprising a pressure chamber for the plastic, said chamber having a transverse slot formed therein constructed to accommodate the edge of said fabric when said fabric moves longitudinally of said chamber, said slot being open at one end and closed at its other end, feed means adjacent the sides and closed end of said slot for feeding plastic to the edge of said fabric as said edge is moved longitudinally of said chamber, pressure means connected to said chamber for forcing said plastic through said feed means, said feed means including spaced-apart upper plate members which are inclined downwardly toward the fabric and also includes spaced-apart lower plate members which are inclined upwardly toward the fabric, the lowermost of said upper plate members being spaced above the uppermost of said lower plate members at a distance less than the thickness of said fabric.

References Cited in the file of this patent
UNITED STATES PATENTS

| | | |
|---|---|---|
| 455,333 | Hyatt | July 7, 1891 |
| 2,293,252 | Foster | Aug. 18, 1942 |
| 2,467,642 | Wilson | Apr. 19, 1949 |